(12) United States Patent
Roy et al.

(10) Patent No.: US 6,946,215 B2
(45) Date of Patent: Sep. 20, 2005

(54) MOLTON HYDRIDE FUEL CELL

(75) Inventors: Prodyot Roy, Saratoga, CA (US); Samir Armando Salamah, Niskayuna, NY (US); Douglas Noss Rodgers, San Jose, CA (US)

(73) Assignee: General Electric Company, Niskayuna, NY (US)

( * ) Notice: Subject to any disclaimer, the term of this patent is extended or adjusted under 35 U.S.C. 154(b) by 443 days.

(21) Appl. No.: 10/064,408

(22) Filed: Jul. 10, 2002

(65) Prior Publication Data

US 2004/0009390 A1 Jan. 15, 2004

(51) Int. Cl.$^7$ .......................... H01M 8/08; H01M 8/14; H01M 8/04
(52) U.S. Cl. .............. 429/46; 429/15; 429/16
(58) Field of Search .............. 429/15, 33, 16, 429/46

(56) References Cited

U.S. PATENT DOCUMENTS

| | | | |
|---|---|---|---|
| 3,953,237 A | * 4/1976 | Epstein et al. | 429/41 |
| 4,714,661 A | * 12/1987 | Kaun et al. | 429/14 |
| 4,833,046 A | 5/1989 | Roy | |
| 5,139,895 A | 8/1992 | Roy et al. | |
| 5,354,627 A | * 10/1994 | Hatoh et al. | 429/40 |
| 5,616,430 A | * 4/1997 | Aoyama | 429/17 |
| 6,071,634 A | * 6/2000 | Fellows | 429/14 |

FOREIGN PATENT DOCUMENTS

| | | |
|---|---|---|
| DE | 3730209 | 3/1988 |
| EP | 1178554 | 6/2002 |

OTHER PUBLICATIONS

G. Deublein et al., "Hydrogen–Conducting Electrolyte Configurations", Solid State Ionics Sep. 28–30, 1988, Part II, Amsterdam, NE, pp. 1084–1088.

R. Proydot, "An Innovative H2/O2 Fuel Cell Using Molten Hydride Electrolyte—A Molten Hydride Electrolyte Fuel Cell (MHFC)", Jan. 23, 2003, XP–002260837, pp. 1–4.

* cited by examiner

*Primary Examiner*—Patrick Joseph Ryan
*Assistant Examiner*—Julian Mercado
(74) *Attorney, Agent, or Firm*—Fletcher Yoder

(57) ABSTRACT

A fuel cell assembly comprises at least one fuel cell. The fuel cell comprises an anode and a cathode held in a spaced apart relationship by at least one spacer element comprising an electrically insulating material. A proximal end of the spacer element is in contact with the cathode, and a distal end is in contact with the anode. An electrolyte is disposed between, and in contact with the anode and the cathode. The electrolyte comprises a molten salt having a hydride ion conductance number greater than about 0.95 at a fuel cell operating temperature. A fuel gas inlet, adjacent to the cathode, is provided for delivering a fuel gas to the electrolyte. An oxidizing gas inlet, adjacent to the anode, is provided for delivering an oxidizing gas to the electrolyte. An exhaust port is in fluid communication with the anode.

33 Claims, 3 Drawing Sheets

MOLTON HYDRIDE FUEL CELL

BACKGROUND OF INVENTION

The present invention relates generally to the field of fuel cells, and more specifically to fuel cells comprising liquid electrolytes.

Various types of fuel cells are known in the art as devices that convert energy from a chemical reaction into electrical energy. Each type of fuel cell has one or more limitations that currently restrict its use to specialized applications. For example, thermally regenerative liquid fuel cells induce hydrogen flow by thermal decomposition of a mixture of lithium hydride and sodium hydride, at a high temperature (for example from about 800° C. to about 1300° C.) maintained by a separate heating device to generate hydrogen. The hydrogen is then passed through the cell at a high pressure (10 atmosphere or above) to mobilize hydride ions, which release electrons at the electrodes for generating electricity. Only a small portion of thermal energy is converted to electrical energy. The requirements of a high temperature heating device and capability of handling high pressure gas increases design complexity including limitations in size and cost. Another example is conventional hydrogen-oxygen fuel cells, where the electrolytes used have a limited mobility for mass transport of positive hydrogen ions ($H^+$) and therefore the generated electrical energy is much less as compared to that ideally available from the electrochemical conversion. Furthermore, in other types of fuel cells such as those using polymer electrolytes, there is a considerable risk of poisoning of electrodes due to the presence of gaseous impurities such as carbon monoxide, hydrogen sulfide, chlorine etc.

Solid oxide fuel cells use metal oxide ceramic electrolytes in solid state. These electrolytes operate at a temperature as high as about 1000° C. This high operating temperature allows transport of oxygen ions, which release electrons at the electrode for generating electricity. However, the use of fragile ceramic electrolytes, the requirement of structural materials sustainable at high temperature, and the requirement of additional cooling systems limit the reliability of solid oxide fuel cells.

Therefore, there is a need in the art for fuel cells that efficiently and reliably operate at lower temperatures than current fuel cells.

SUMMARY OF INVENTION

An embodiment of the present invention provides a fuel cell assembly comprising at least one fuel cell. The fuel cell comprises an anode and a cathode held in a spaced apart relationship by at least one spacer element comprising an electrically insulating material. A proximal end of the spacer element is in contact with the cathode, and a distal end is in contact with the anode. An electrolyte is disposed between, and in contact with the anode and the cathode. The electrolyte comprises a molten salt having a hydride ion conductance number greater than about 0.95 at a fuel cell operating temperature. A fuel gas inlet, adjacent to the cathode, is provided for delivering a fuel gas to the electrolyte. An oxidizing gas inlet, adjacent to the anode, is provided for delivering a oxidizing gas to the electrolyte. An exhaust port is in fluid communication with the anode.

Another embodiment of the present invention provides a fuel cell assembly comprising at least one fuel cell further comprising an anode and a cathode held in a spaced apart relationship by at least one spacer element. The spacer element comprises an electrically insulating material. A proximal end of the spacer element is in contact with the cathode, and a distal end is in contact with the anode. An electrolyte disposed between, and in contact with, the anode and the cathode comprises at least one molten alkali metal halide selected from the group consisting of lithium chloride and potassium chloride and further comprising lithium hydride. A fuel gas inlet adjacent to the cathode is provided for delivering a fuel gas, comprising hydrogen, to the electrolyte. An oxidizing gas inlet adjacent to the anode is provided for delivering an oxidizing gas, comprising oxygen, to the electrolyte. An exhaust port is in fluid communication with the anode.

Still another embodiment of the present invention provides a fuel cell, which comprises an anode, a cathode in a spaced-apart relationship with the anode, a source of hydride ions in fluid in communication with the cathode, a source of oxygen in fluid communication with the anode, and an electrolyte. The electrolyte comprises a molten salt, the molten salt having a hydride ion conductance number greater than about 0.95 at a fuel cell operating temperature.

These and other features, aspects and advantages of the present invention will be better understood with reference to the following description, appended claims, and accompanying drawings.

DETAILED DESCRIPTION

Figure 1:
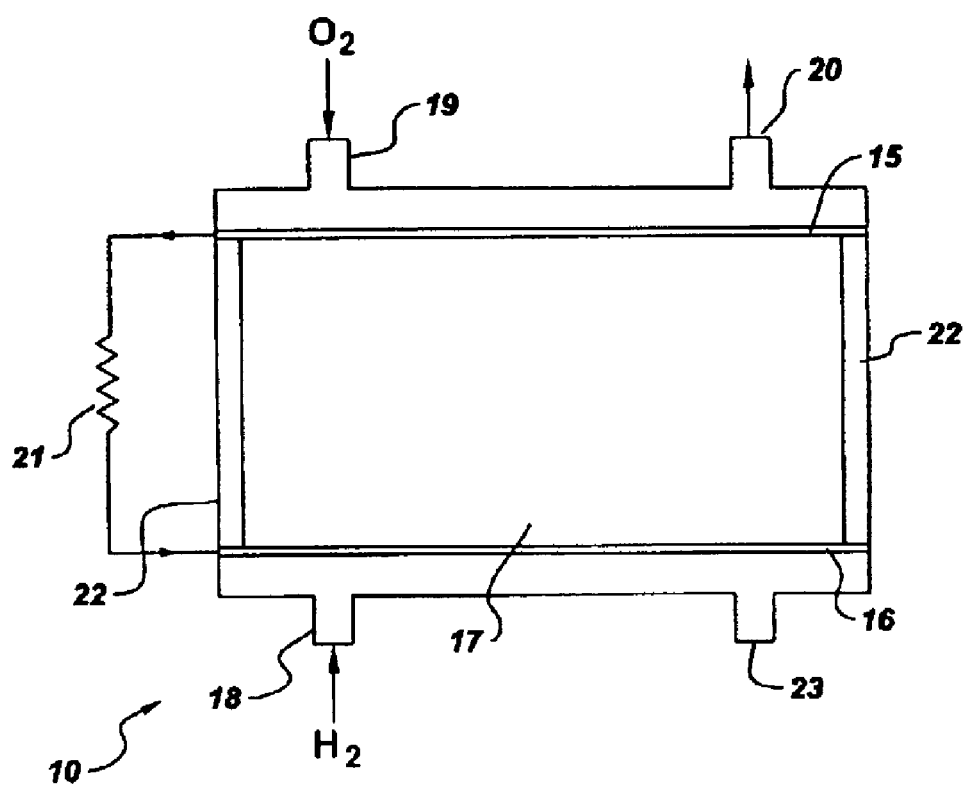
FIG. 1 is a cross-sectional view of the fuel cell for converting chemical energy to electricity.

Referring to FIG. 1, one embodiment of the present invention is a fuel cell assembly, which is an array or stack comprising at least one fuel cell 10. A fuel cell 10 according to this embodiment comprises an anode 15 and a cathode 16 held in a spaced apart relationship by at least one spacer element 22. A spacer element 22 according to this embodiment comprises an electrically insulating material, such as, but not limited to, alumina, zirconia, boron nitride, silicon nitride, aluminum nitride, and silicate glass. The spacer element 22 further comprises a proximal end in contact with cathode 16 and a distal end in contact with anode 15.

In one embodiment, at least one of anode 15 and cathode 16 comprises a hydrogen-permeable solid membrane. The property of hydrogen absorption by these materials allows rapid diffusion of, for example, a fuel gas, which is supplied through the fuel gas inlet 18. In particular embodiments, the membrane comprises at least one material selected from the group consisting of palladium, vanadium, beta titanium, and an alloy comprising palladium and silver. In another embodiment at least one of the anode 15 and the cathode 16 comprises a sintered refractory material, which also allows rapid diffusion of gas through the porous structure. Suitable sintered refractory materials include, but are not necessarily limited to, molybdenum, tungsten, rhenium, and vanadium. In another embodiment, a composite material comprising the sintered refractory material and the solid membrane is used in at least one of the anode 15 and the cathode 16, for facilitating faster diffusion of gas.

In certain embodiments, the anode 15 and the cathode 16 are tubular in configuration. Tubular configuration helps to maintain uniformity in flow thereby establishing stable density gradient across the fuel cell. This results in stable, time independent current characteristics of the fuel cell. Additionally, tubular configuration maintains structural integrity and soundness over a long span of time and enhances packaging compactness. In other embodiments, the anode 15 and the cathode 16 are planar. Planar geometrical configuration facilitates in improving diffusion rate, which enhances power density. Additionally, planar configurations are readily available because of ease of manufacturing.

In some embodiments at least one of the anode 15 and the cathode 16 has a thickness in the range from about 50 microns to about 500 microns. In certain embodiments the thickness of the anode 15 and the cathode 16 is in the range from about 50 microns to about 250 microns. Still in accordance with some other embodiments the thickness of the anode 15 and the cathode 16 can be in the range from about 75 microns to about 150 microns. Generally, thickness of the anode 15 and the cathode 16 is designed to be as low as allowable by mechanical design constraints, in order to minimize resistance of the fuel cell 10.

An electrolyte 17 is disposed between, and in contact with the anode 15 and the cathode 16. The electrolyte 17 comprises a molten salt having a hydride ion conductance number greater than about 0.95 at a fuel cell operating temperature. Using an electrolyte 17 with a hydride ion (H⁻) conductance number in this range ensures that the fuel cell will operate with suitable efficiency to be cost-effective. In some embodiments, the fuel cell operating temperature is in the range from about 250° C. to about 650° C., which ensures that certain suitable electrolyte materials are in molten state and capable of conducting hydride ions at the desired level of efficiency. In certain embodiments, the fuel cell operating temperature of the electrolyte 17 is in the range from about 250° C. to about 600° C. According to particular embodiments of the invention, the fuel cell operating temperature is in the range from about 300° C. to about 450° C.

In some embodiments, the electrolyte 17 comprises at least one molten alkali halide and at least one molten metal hydride. The present inventors have found that electrolytes of this type have suitably high hydride ion conductance, at fuel cell operating temperatures in the range described above, which are to be used in embodiments of the present invention. In accordance with one embodiment of the invention the alkali halide is selected from the group consisting of lithium chloride, lithium bromide, lithium fluoride, potassium chloride, potassium bromide, potassium fluoride, sodium chloride, sodium bromide, sodium fluoride, and mixtures thereof. Suitable alkali hydrides include, but are not necessarily limited to, lithium hydride, potassium hydride, sodium hydride, and mixtures thereof. According to one embodiment of the invention the molten salt comprises the alkali hydride in the range from about 5 weight percent to about 25 weight percent of the total molten salt mixture. This ensures mobility of hydride ions even at initial start up of the fuel cell. In particular embodiments, the molten salt comprises the alkali hydride in the range from about 10 weight percent to about 20 weight percent of the molten salt mixture.

A fuel gas inlet 18 adjacent to cathode 16 delivers fuel gas to the electrolyte 17. The fuel gas, in some embodiments, comprises hydrogen; suitable fuel gasses include, but are not limited to, gasses comprising at least one of methane and propane. Those skilled in the art will appreciate that in cases where a hydrocarbon compound, such as methane or propane, is used as the fuel gas, a reformer (not shown) is used to extract hydrogen from the hydrocarbon compound, and the hydrogen is then delivered to the electrolyte 17 through the fuel gas inlet 18. An oxidizing gas inlet 19, adjacent to the anode 15 delivers an oxidizing gas to the electrolyte 17. In some embodiments, the oxidizing gas comprises oxygen, and in particular embodiments, the oxidizing gas comprises air.

Figure 2:
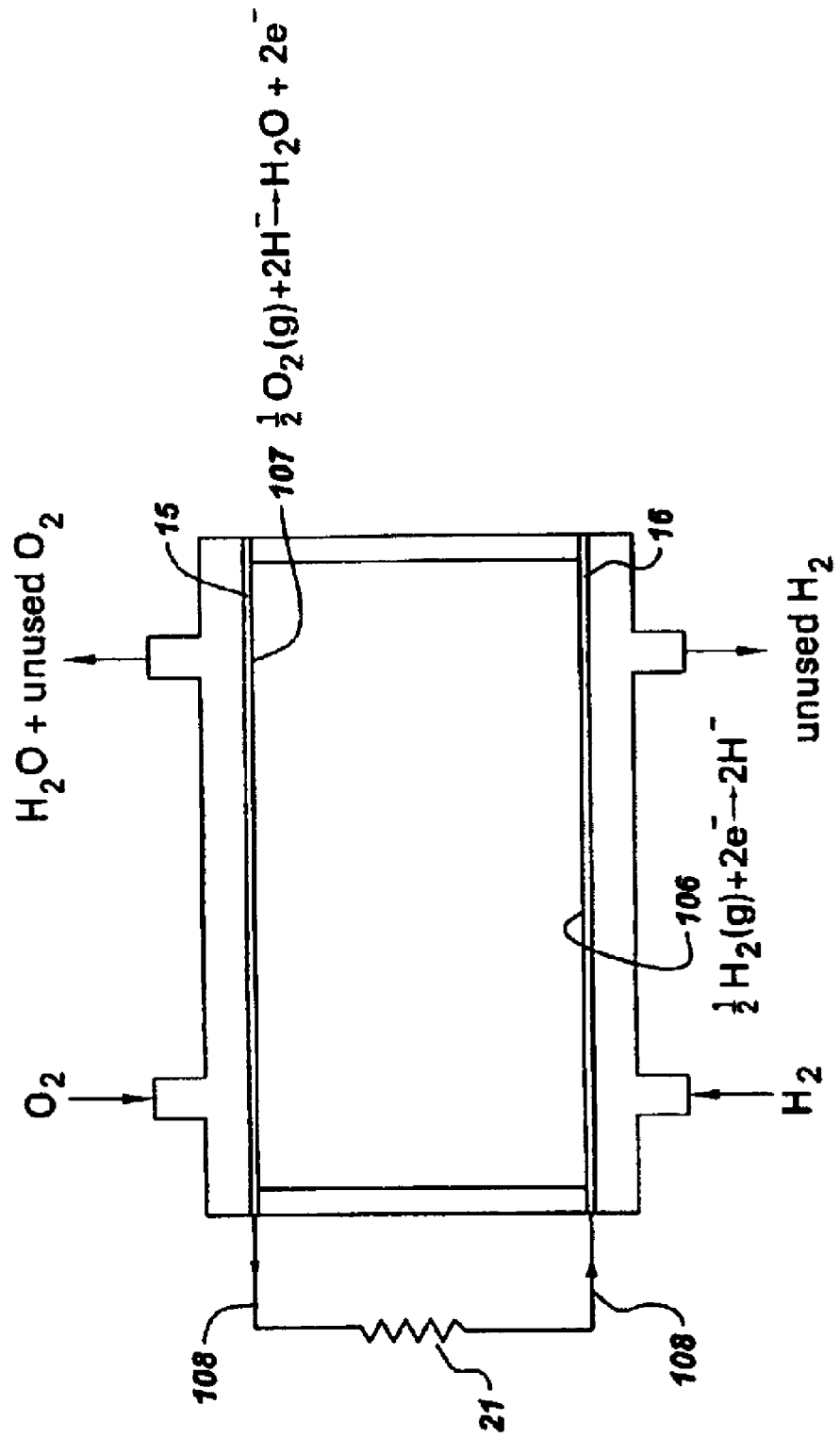
FIG. 2 is a cross-sectional view of the fuel cell showing the mechanism of electricity generation.

Referring to FIG. 2, the fuel gas diffuses through the cathode 16. The hydrogen in the fuel gas reacts with free electrons in the electrode according to the reaction 106.

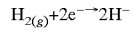

$$H_{2(g)} + 2e^- \rightarrow 2H^-$$

The hydride ions transported across electrolyte 17 diffuse into and across anode 15, whereupon they contact the oxidizing gas and react with this gas to produce and free electrons. Anode 15 serves as a physical barrier to prevent mixing of the oxidizing gas and the reaction product water with electrolyte 17. The free electrons flow from the anode 15 to the cathode 16 when they are connected through an external load 21. The anode reaction 107 is represented in FIG. 2 as follows.

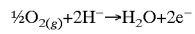

$$\tfrac{1}{2}O_{2(g)} + 2H^- \rightarrow H_2O + 2e^-$$

Overall reaction is represented by

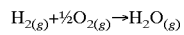

$$H_{2(g)} + \tfrac{1}{2}O_{2(g)} \rightarrow H_2O_{(g)}$$

The above reaction is exothermic and hence maintains the operating temperature of the fuel cell at a constant level after initial start up. The water molecules thus formed in the reaction are converted to vapor phase. Unused gases and water vapor are exhausted through an exhaust port 20.

Another embodiment of the present invention is a fuel cell comprising an anode b 15a cathode 16 in a spaced-apart relationship with the anode 15, a source of hydride ions in fluid communication with the cathode 16, a source of oxygen in fluid communication with the anode, and an electrolyte 17 comprising a molten salt, the molten salt having a hydride ion conductance number greater than about 0.95 at a fuel cell operating temperature. The various alternatives described for elements of the fuel cell assembly of the present invention also apply to these fuel cell embodiments. In these embodiments, the source of hydride ions is often a fuel gas, and the source of oxygen is often an oxidizing gas, as described previously.

Figure 3:
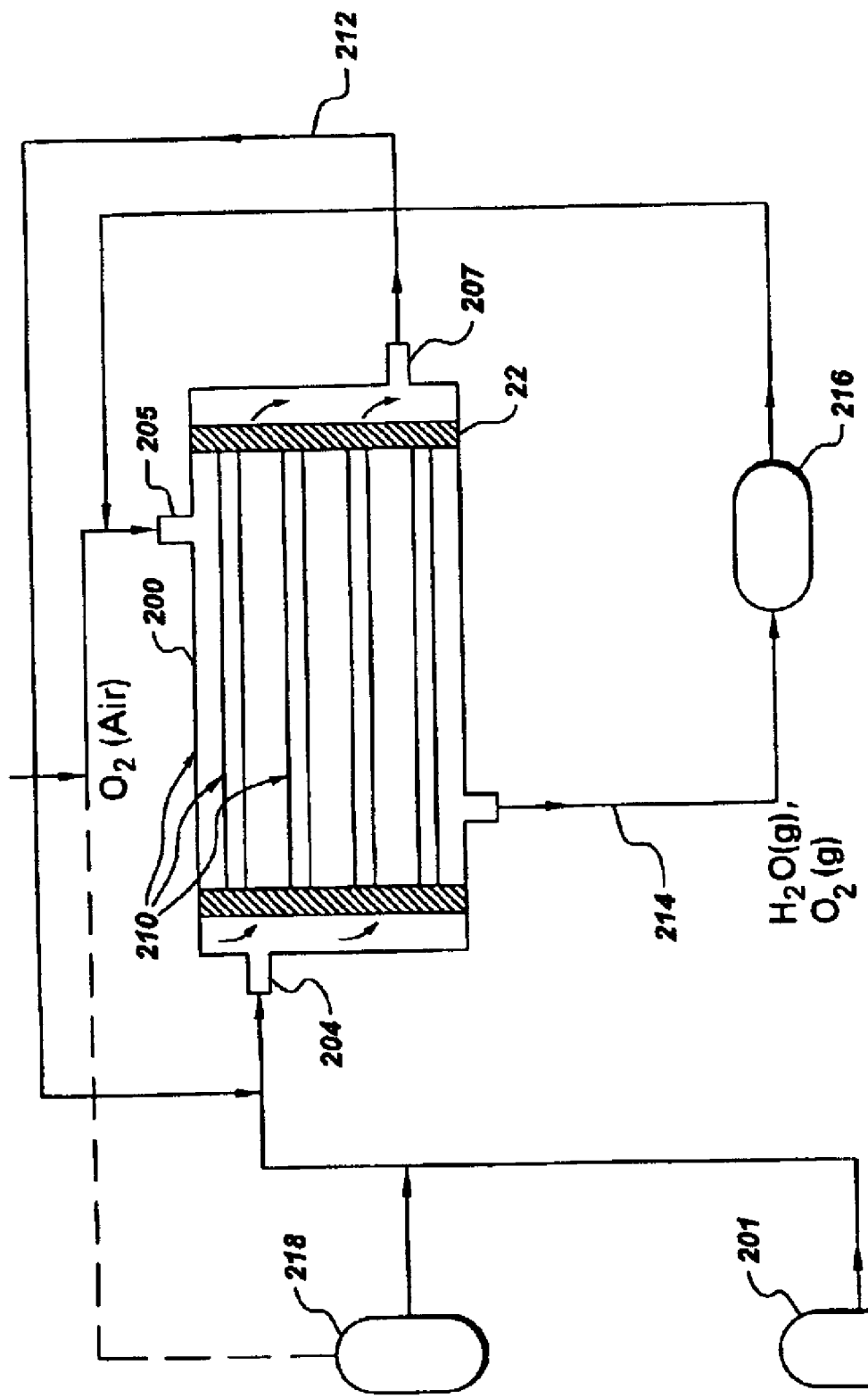
FIG. 3 is a typical application of a fuel cell stack in a centralized generation plant.

The fuel gas and oxidizing gas can be obtained from a variety of sources and therefore this type of fuel cell is suitable for use in various applications. For example, it can be used in a skid mounted mobile reformer unit where hydrocarbons are cracked to produce hydrogen and is therefore suitable to use in electrically powered vehicle or any other small-scale generation. A typical fuel cell stack for large-scale generation in central power plants is shown in FIG. 3. For large-scale generation in central power plant, hydrogen may typically be obtained from coal gas by water gas shift reaction. Hydrogen gas thus produced from a coal reformer gas in a shift converter 201 is fed to a fuel cell stack 200 at the inlet 204. The fuel cell stack 200 contains individual fuel cell units 210. Oxygen or atmospheric air is fed into the inlet 205 of the fuel cell stack 200. The unused oxygen and the water vapor produced in the reaction as explained above are recycled through a condenser 216 and connecting duct 214. The unused hydrogen is recycled from port 207 though a connecting duct 212. The fuel cell can also be used for space power applications where hydrogen and oxygen can be supplied from a cryogenic storage 218.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A fuel cell assembly comprising:
   at least one fuel cell comprising
   a. an anode and a cathode held in a spaced apart relationship by at least one spacer element comprising an electrically insulating material;
   b. an electrolyte comprising a molten salt having a hydride ion conductance number greater than about 0.95 at a fuel cell operating temperature, said electrolyte disposed between, and in contact with, said anode and said cathode;
   c. a fuel gas inlet for delivering a fuel gas to said electrolyte, wherein said fuel gas inlet is adjacent to said cathode;
   d. a oxidizing gas inlet for delivering a oxidizing gas to said electrolyte, wherein said oxidizing gas inlet is adjacent to said anode; and
   e. an exhaust port in fluid communication with said anode;
   wherein said oxidizing gas and fuel gas react to produce water and free electrons.

2. The fuel cell assembly of claim 1, wherein at least one of said anode and said cathode comprises a hydrogen permeable solid membrane.

3. The fuel cell assembly of claim 2, wherein said membrane comprises at least one material selected from the group consisting of palladium, vanadium, beta titanium, and an alloy comprising palladium and silver.

4. The fuel cell assembly of claim 1, wherein at least one of said anode and said cathode comprises at least one sintered refractory material.

5. The fuel cell assembly of claim 4, wherein said sintered refractory material comprises at least one material selected from the group consisting of molybdenum, tungsten, rhenium, and vanadium.

6. The fuel cell assembly of claim 4, wherein at least one of said anode and said cathode further comprises a composite material, said composite material comprising said sintered refractory material and a hydrogen-permeable solid membrane.

7. The fuel cell assembly of claim 1, wherein at least one of said anode and said cathode is planar.

8. The fuel cell assembly of claim 1, wherein at least one of said anode and said cathode is tubular.

9. The fuel cell assembly of claim 1, wherein at least one of said anode and said cathode has a thickness in the range from about 50 microns to about 500 microns.

10. The fuel cell assembly of claim 9, wherein said thickness is in the range from about 50 microns to about 250 microns.

11. The fuel cell assembly of claim 10, wherein said thickness is in the range from about 75 microns to about 150 microns.

12. The fuel cell assembly of claim 1, wherein said molten salt comprises at least one molten alkali halide and at least one molten metal hydride.

13. The fuel cell assembly of claim 12, wherein said alkali halide of said molten salt is selected from the group consisting of lithium chloride, lithium bromide, lithium fluoride, potassium chloride, potassium bromide, potassium fluoride, sodium chloride, sodium bromide, sodium fluoride, and mixtures thereof.

14. The fuel cell assembly of claim 12, wherein said alkali hydride of said molten salt is selected from the group consisting of lithium hydride, potassium hydride, sodium hydride, and mixtures thereof.

15. The fuel cell assembly of claim 14, wherein said molten salt comprises said alkali hydride in the range of about 5 weight percent to about 25 weight percent.

16. The fuel cell assembly of claim 15, wherein said molten salt comprises said alkali hydride in the range of about 5 weight percent to about 20 weight percent.

17. The fuel cell assembly of claim 16, wherein said molten salt comprises said alkali hydride in the range of about 10 weight percent to about 20 weight percent.

18. A fuel cell assembly as in claim 1, wherein said fuel cell temperature is in the range from about 250° C. to about 650° C.

19. A fuel cell assembly as in claim 1, wherein said fuel cell temperature is in the range from about 250° C. to about 600° C.

20. A fuel cell assembly as in claim 1, wherein said fuel cell temperature is in the range from about 300° C. to about 450° C.

21. The fuel cell assembly of claim 1, wherein said at least one spacer element comprises at least one material selected from the group consisting of alumina, zirconia, boron nitride, silicon nitride, aluminum nitride, and silicate glass.

22. A fuel cell assembly comprising:
   at least one fuel cell comprising
   a. an anode and a cathode held in a spaced apart relationship by at least one spacer element comprising an electrically insulating material;
   b. an electrolyte comprising at least one molten alkali metal halide selected from the group consisting of lithium chloride and potassium chloride and further comprising lithium hydride, said electrolyte disposed between, and in contact with, said anode and said cathode;
   c. a fuel gas inlet for delivering a fuel gas comprising hydrogen to said electrolyte, wherein said fuel gas inlet is adjacent to said cathode;
   d. a oxidizing gas inlet for delivering a oxidizing gas comprising oxygen to said electrolyte, wherein said oxidizing gas inlet is adjacent to said anode; and
   e. an exhaust port in fluid communication with said anode;
   wherein said oxygen reacts with said hydrogen to produce water and free electrons.

23. The fuel cell assembly of claim 22, wherein said fuel gas is a gas comprising at least one of methane and propane.

24. The fuel cell assembly of claim 22, wherein the oxidizing gas comprises air.

25. The fuel cell assembly of claim 22, wherein said fuel cell assembly comprises a plurality of said fuel cells connected electrically.

26. A fuel cell comprising:
   an anode;
   a cathode in a spaced-apart relationship with said anode;
   a source of hydride ions in fluid communication with said cathode;
   a source of oxygen in fluid communication with said anode; and an electrolyte comprising a molten salt, said molten salt having a hydride ion conductance number greater than about 0.95 at a fuel cell operating temperature;
   wherein said hydride ions react with said oxygen to produce water and free electrons.

27. The fuel cell of claim 26, wherein said molten salt comprises at least one molten alkali halide and at least one molten metal alkali hydride.

28. The fuel cell of claim 27, wherein said molten alkali halide of said molten salt is selected from the group consisting of lithium chloride, lithium bromide, lithium fluoride, potassium chloride, potassium bromide, potassium fluoride, sodium chloride, sodium bromide, sodium fluoride, and mixtures thereof.

29. The fuel cell of claim 27, wherein said molten metal alkali hydride of said molten salt is selected from the group consisting of lithium hydride, potassium hydride, sodium hydride, and mixtures thereof.

30. The fuel cell assembly of claim 27, wherein said molten salt comprises said molten metal alkali hydride in the range of about 5 weight percent to about 25 weight percent.

31. The fuel cell assembly of claim 30, wherein said molten salt comprises said alkali hydride in the range of about 5 weight percent to about 20 weight percent.

32. The fuel cell assembly of claim 31, wherein said molten salt comprises said alkali hydride in the range of about 10 weight percent to about 20 weight percent.

33. The fuel cell of claim 26, wherein said fuel cell temperature is in the range from about 300° C. to about 450° C.

* * * * *

UNITED STATES PATENT AND TRADEMARK OFFICE
CERTIFICATE OF CORRECTION

PATENT NO. : 6,946,215 B2  Page 1 of 1
APPLICATION NO. : 10/064408
DATED : September 20, 2005
INVENTOR(S) : Prodyot Roy, Samir Armando Salamah and Douglas Noss Rodgers It is certified that error appears in the above-identified patent and that said Letters Patent is hereby corrected as shown below:

Title page Item [54] to read as follows:

--MOLTEN HYDRIDE FUEL CELL--

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,946,215 B2 | Page 1 of 1 |
| APPLICATION NO. | : 10/064408 | |
| DATED | : September 20, 2005 | |
| INVENTOR(S) | : Prodyot Roy, Samir Armando Salamah and Douglas Noss Rodgers | |

It is certified that error appears in the above-identified patent and that said Letters Patent is hereby corrected as shown below:

Title page Item [54] and Column 1, line 1 to read as follows:

--MOLTEN HYDRIDE FUEL CELL--

This certificate supersedes the Certificate of Correction issued August 18, 2009.

Signed and Sealed this

Eighth Day of September, 2009

David J. Kappos
*Director of the United States Patent and Trademark Office*